United States Patent [19]
Saito et al.

[11] Patent Number: 5,282,106
[45] Date of Patent: Jan. 25, 1994

[54] MAGNETIC DISK CARTRIDGE

[75] Inventors: Tadashi Saito; Nobuyuki Kishine; Takao Kanai; Mikio Okano, all of Tochigi, Japan

[73] Assignee: Kao Corporation, Tokyo, Japan

[21] Appl. No.: 740,316

[22] Filed: Aug. 5, 1991

[30] Foreign Application Priority Data

Aug. 8, 1990 [JP] Japan .................. 2-83253[U]

[51] Int. Cl.$^5$ .............................................. G11B 23/03
[52] U.S. Cl. .................................................. 360/133
[58] Field of Search .................... 360/133; 206/444

[56] References Cited

U.S. PATENT DOCUMENTS

| | | | |
|---|---|---|---|
| 4,510,546 | 4/1985 | Asami et al. | 360/135 |
| 4,648,002 | 3/1987 | Mroz et al. | 360/133 |
| 4,688,129 | 8/1987 | Gruehn et al. | 360/133 |
| 4,709,816 | 12/1987 | Matsumoto et al. | 360/133 |
| 4,737,876 | 4/1988 | Brock et al. | 360/133 |
| 4,864,451 | 9/1989 | Iwaga et al. | 360/133 |
| 4,977,475 | 12/1990 | Shiba et al. | 360/133 |
| 5,091,814 | 2/1992 | Ikebe et al. | 360/133 |

FOREIGN PATENT DOCUMENTS 61-147017  9/1986  Japan .................. G11B 23/03

Primary Examiner—Bruce C. Anderson
Attorney, Agent, or Firm—Nils H. Ljungman & Associates

[57] ABSTRACT

A magnetic disk cartridge retains a rotational magnetic disk in a case through liners, which contact the associated surfaces of the disk and each have multiple long protrusions formed almost uniformly and almost in parallel to one another on the whole surface on the disk side. As the magnetic disk rotates, the angle of the disk surface contacting the long protrusions can gradually change, thus ensuring removal of dust from the disk. In additon, this structure can reduce the frictional resistance between the liner's surface and magnetic disk, which contributes to faster rotation of the disk.

17 Claims, 3 Drawing Sheets

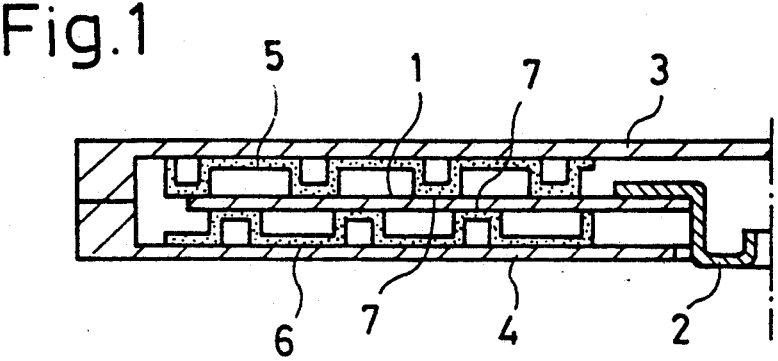
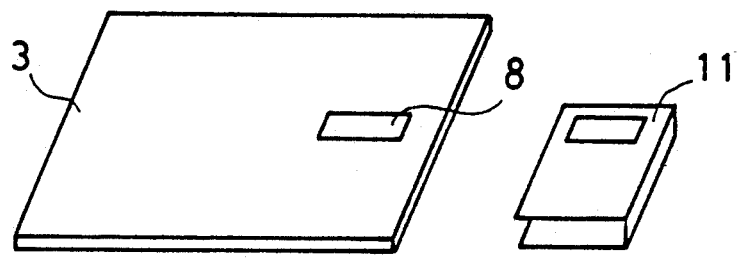
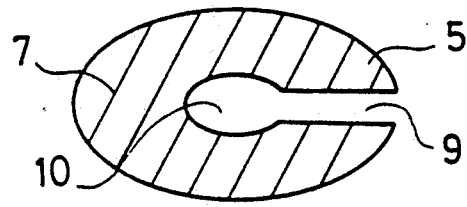
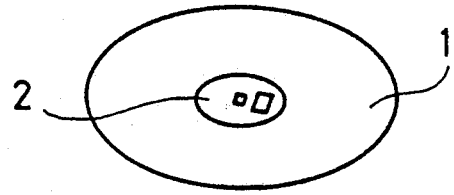
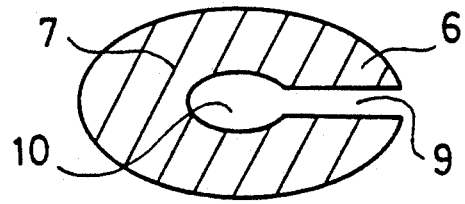
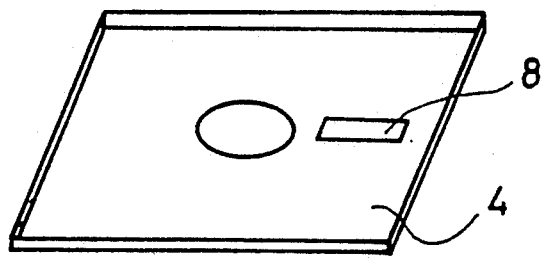

MAGNETIC DISK CARTRIDGE

BACKGROUND OF THE INVENTION (1.) Field of the Invention

The present invention relates to a magnetic disk cartridge which magnetically records and holds information.

(2.) Description of the Related Art

A conventional magnetic disk cartridge is designed as follows.

In general, nonwoven fabric liners are adhered respectively to the inner surfaces of a separate type plastic cases, with a rotatable magnetic disk disposed therebetween in such a way that the surfaces of each liner may contact the both sides of the magnetic disk. The liners each serve as cleaning sheet and a prevention against abrasion of the magnetic disk surfaces.

The liner may be designed as disclosed in Japanese Unexamined Utility Model Publication No. Sho 63-52184 in such a manner as to have three long protrusions formed thereon protruding on the magnetic disk side and extending radially.

With the use of such a liner, the long protrusions strongly contact with the magnetic disk to clean the disk surface while the other portion of the liner touches the disk very lightly, resulting in a small frictional resistance. The liners will not interfere with the fast rotation of the magnetic disk.

Since the long protrusions on each liner of the conventional magnetic disk cartridge extend radially, however, when the magnetic disk rotates, the surface of the disk always contacts the radial long protrusions at almost the same angle. The contacting pattern does not therefore change, making the liners exert an insufficient effect to clean the magnetic disk.

In addition, to form the long protrusions radially on the liner, it is necessary to cut a rolled liner sheet in a disk shape before forming radial long protrusions on the cut liner by pressing, or after forming radial long protrusions on the liner sheet. In this method, centering of the disk shape liner is indispensable and therefore the productivity of magnetic disk cartridge will be remarkably reduced.

SUMMARY OF THE INVENTION

It is therefore an object of the present invention to provide a magnetic disk cartridge which can enhance the effect of cleaning a magnetic disk without interfering with the fast rotation of the disk. It is another object of the present invention to provide a magnetic disk cartridge with high productivity.

To achieve the objects, a magnetic disk cartridge according to the present invention comprises a case; liners disposed in the case; and a magnetic disk accommodated rotatably in contact with surfaces of the liners in the case, the liners each having multiple long protrusions formed all over a surface on a magnetic disk side almost uniformly and almost in parallel to one another.

The protrusions may be formed to extend linearly.

It is preferable that at least one of the long protrusions passes a center hole of each liner, or that at least one of the long protrusions contacts the center hole of the liner.

In addition, it is preferable that an interval between adjoining long protrusions be set smaller than a diameter of the center hole of each liner.

Further, it is also preferable that the long protrusions be formed in a zigzag pattern in a plain parallel to the surface of the magnetic disk. The long protrusions may be formed in a sinusoidal or sawtooth pattern.

Furthermore, each long protrusion may be discontinuous. In this case, it is preferable that at least one substantial long protrusion portion is positioned on all rotational loci of the surface of the magnetic disk.

With any of the long protrusion patterns described above, it is possible to gradually change the angle of the disk surface contacting the long protrusions as the magnetic disk rotates. This can significantly improve the effect of dust removing. In addition, because other portions of the liner but the long protrusions lightly contact the magnetic disk, the frictional resistance to the magnetic disk can be reduced, which contributes to faster rotation of the disk.

Accordingly, it is possible to provide a high-quality magnetic disk cartridge which can surely avoid a read/write error caused by dust.

In manufacturing a magnetic disk cartridge, a liner sheet with long protrusions uniformly formed thereon can be cut anywhere in a disk shape to provide liners without requiring the centering process mentioned above, thus resulting in higher productivity and lower manufacturing cost.

The structural features of the present invention and the action and effects based on the features will be apparent from the following description of the preferred embodiment in conjunction with the accompanying drawings.

BRIEF DESCRIPTION OF THE DRAWINGS

FIG. 1 is a fragmentary cross section illustrating a magnetic disk cartridge according to one embodiment of the present invention;

FIG. 2 is an exploded perspective view of the magnetic disk cartridge;

DETAILED DESCRIPTION OF THE PREFERRED EMBODIMENT

A preferred embodiment of the present invention will now be described referring to FIGS. 1 through 10.

As shown in FIGS. 1 and 2, a magnetic disk 1 has a hub 2 formed in its center to rotate the disk and is retained in plastic cases 3 and 4 of a separate type.

Figure 3:
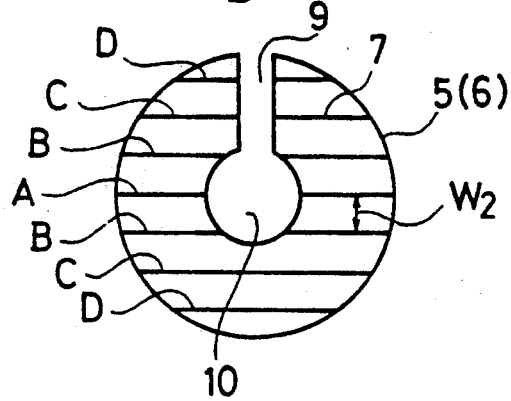
FIG. 3 is a plan view illustrating a liner.
Figure 4:
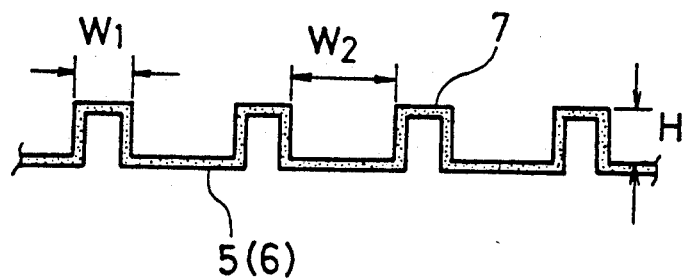
FIG. 4 is a fragmentary cross section illustrating the liner.
Figure 5:
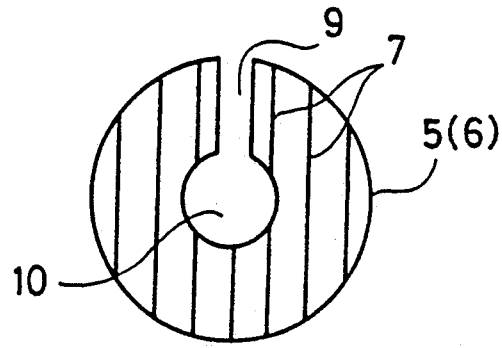
FIGS. 5 through 10 are plan views illustrating modifications of the liner.
Figure 6:
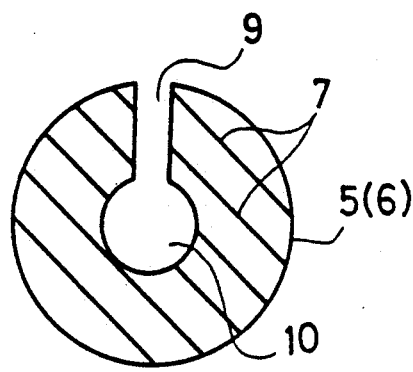
Figure 7:
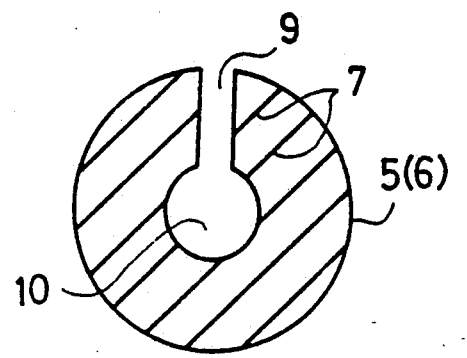

Liners 5 and 6, respectively adhered to the inner walls of the cases 3 and 4, each have multiple linear long protrusions 7 formed in parallel and uniformly in its whole surface on the side of the magnetic disk 1, as shown in FIG. 3.

Further, the liners 5 and 6 have gaps 9 provided where they correspond to head windows 8 of the cases 3 and 4, and have central openings 10 facing the hub 2 of the magnetic disk 1.

A sliding shutter 11 opens and closes the head windows 8, and the cases 3 and 4 are ultrasonically fused together at their four corners.

The long protrusions 7 are determined according to their width W1 and height H, and the width W2 of the groove defined by the adjoining long protrusions. Through various experiments conducted, it was found that designing of the long protrusions 7 as follows could permit the magnetic disk to be efficiently cleaned and protected. The dimensions of the long protrusions 7 can vary regardless of presently available disk sizes, such as 3.5 inches, 5.25 inches and 8 inches. Figures in the parentheses are more preferable values.

Protrusion Width W1: 1 to 10 mm (2 to 6 mm)
Protrusion Height H: 0.3 to 2.0 mm (0.5 to 1.6 mm)
Groove Width W2: 1 to 20 mm (2 to 10 mm)

Too many protrusions 7 or the exceedingly high protrusions 7 would increase the rotational torque of the magnetic disk 1 and damage the magnetic disk 1. In general, as the width of the grooves, W2, (interval between the long protrusions) increases, it is better to set the height H of the protrusions greater. As the width W2 decreases, it is better to reduce the height H.

Such a width and height need to be determined in light of the material and thickness of the liners 5 and 6, the size of the magnetic disk 1, etc.

Since the protrusions 7 are formed linear and parallel to one another as described above, the angle of the surface of the magnetic disk 1 contacting the individual protrusions 7 gradually varies in accordance with the rotation of the magnetic disk 1. Accordingly, the pattern of the magnetic disk 1 contacting the protrusions 7 can be changed, making it possible to surely clean the surfaces of the magnetic disk 1.

More specifically, as shown in FIG. 3, the magnetic disk 1 contacts a protrusion A among the protrusions 7 at almost right angles, but as the magnetic disk 1 contacts protrusions B, C and D its contact angle becomes acuter.

The magnetic disk 1 very lightly contacts the liners 5 and 6 where the protrusions 7 are not present (or the groove portions), allowing the magnetic disk 1 to rotate at a high speed.

To provide the liners 5 and 6, a roll of a nonwoven fabric for liners, made of polyester or rayon texture, pressed on one side with a metal plate to form the protrusions 7 with predetermined size and density, is cut in almost disk shapes.

Compared with the conventional method for forming radial protrusions, this method requires no centering process in cutting the liners. Productivity therefore improves signigicantly, contributing to the reduction of the manufacturing cost.

FIG. 5 through 10 illustrate different shapes of the liners 5 and 6 as modifications thereof.

Figure 8:
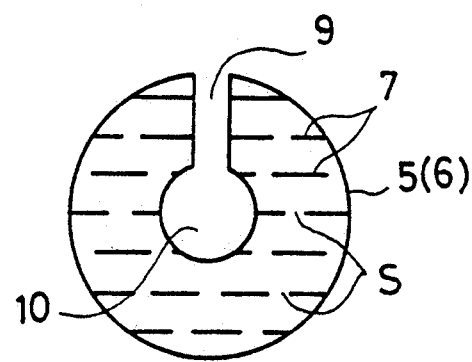
Figure 9:
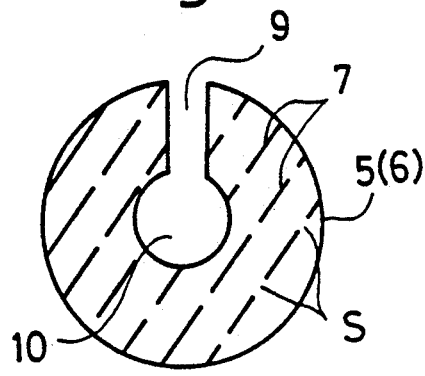
Figure 10:
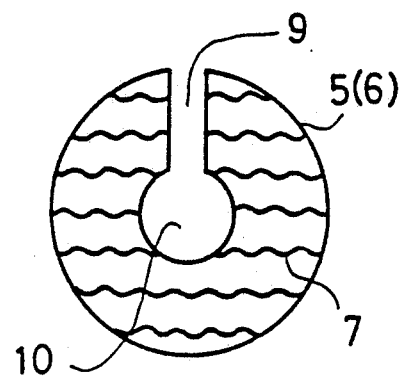

As long as size and density of the long protrusions 7 extending in parallel are properly determined to efficiently clean and protect the magnetic disk 1, the long protrusions 7 may be formed in any direction, lateral horizontal or diagonal. Further, the long protrusions 7 should not necessarily extend continuously. They may be formed discoutinuous as shown in FIGS. 8 and 9 (indicated by S), or may be formed to be parallel sinusoidal waves as shown in FIG. 10. The long protrusions may be formed in a sawtooth pattern instead of the sinusoidal one.

With those modified liners, it is possible to produce the same effects as acquired by the first type of produce the same effect as acquired by the first type of liners.

What is claimed is:

1. A magnetic disk cartridge comprising:
an outer casing:
said outer casing comprising two separate plastic case portions;
a magnetic disk being mounted for rotation, in a plane of rotation, within said outer casing;
liner means being disposed adjacent said magnetic disk and within said outer casing;
said liner means comprising a plurality of raised portions thereupon;
said liner means being homogeneous and comprising a nonwoven fabric material;
said plurality of raised portions extending towards said magnetic disk and being disposed in contact with said magnetic disk;
said plurality of raised portions being generally elongated and extending in a plane parallel to the plane of rotation of said magnetic disk;
said plurality of raised portions having contact portions, said contact portions being disposed in contact with said magnetic disk;
said contact portions of said plurality of raised portions being flat in a plane parallel to the plane of rotation of said magnetic disk;
wherein, for each liner, said plurality of raised portions are disposed generally in parallel with one another; and
wherein each of said plurality of raised portions has a generally rectangular cross-section in a plane perpendicular to the plane or rotation of said magnetic disk.

2. A magnetic disk cartridge according to claim 1, wherein said raised portions extend linearly.

3. A magnetic disk cartridge according to claim 1, wherein at least one of said raised portions passes a center hole of each liner.

4. A magnetic disk cartridge according to claim 1, wherein at least one of said raised portions contacts a center hole of each liner.

5. A magnetic disk cartridge according to claim 1, wherein said raised portions are formed in a zigzag pattern in a plane parallel to an associated surface of the magnetic disk.

6. A magnetic disk cartridge according to claim 5, wherein said zigzag pattern is a sinusoidal pattern.

7. A magnetic disk cartridge according to claim 5, wherein said zigzag pattern is a sawtooth pattern.

8. A magnetic disk cartridge according to claim 1, wherein said raised portions are each discontinuous.

9. A magnetic disk cartridge according to claim 8, wherein at least one substantially long portion of a raised portion is positioned on all rotational loci of a surface of the magnetic disk.

10. A magnetic disk cartridge according to claim 1, wherein the width of a raised portion is between about 2 and about 6 millimeters and the height thereof is between about 0.5 and about 1.6 millimeters.

11. The magnetic disk cartridge according to claim 1, wherein:
said flat contact portions define a first dimension, the first dimension representing a width of said flat contact portion and being measured in said plane perpendicular to the plane or rotation of said magnetic disk;
a second dimension represents a distance between a first of said flat contact portions and a second, adjacent one of said flat contact portions, the second dimension being measured in said plane perpendicular to the plane of rotation of said magnetic disk; and
the first dimension represents a substantial portion of the sum of the first dimension and the second dimension.

12. The magnetic disk cartridge according to claim 11, wherein:
said magnetic disk comprises two faces opposite from one another;
said liner means comprises two liners, said two liners being disposed at opposite faces of said magnetic disk;
each of said liners comprises a central hole, each said central hole having a diameter; and
the second dimension being less than the diameter of each said central hole.

13. The magnetic disk cartridge according to claim 12, wherein, for each liner, said plurality of raised portions are disposed at substantially uniform intervals from one another.

14. The magnetic disk cartridge according to claim 13, wherein the first dimension is between about 2 millimeters and about 6 millimeters.

15. The magnetic disk cartridge according to claim 14, wherein the first dimension is between about 2 millimeters and about 10 millimeters.

16. The magnetic disk cartridge according to claim 15, wherein:
each of said raised portions has a height dimension defined in said plane perpendicular to the plane of rotation of said magnetic disk; and
the height dimension of each of said raised portions is between about 0.5 millimeters and about 1.6 millimeters.

17. The magnetic disk cartridge according to claim 16, wherein:

each of said plastic case portions comprises a head window;
said magnetic disk cartridge further comprises a sliding shutter for opening and closing said windows;
each of said raised portions extends linearly in a plane parallel to the plane of rotation of said magnetic disk;
at least one of said raised portions is interrupted by the center hole of one of said two liners;
said outer casing comprises a pair of inner faces, each of said pair of inner faces facing towards a corresponding face of said magnetic disk;
each of said liners is disposed against a corresponding one of said inner faces of said outer casing;
each of said liners generally has a zigzag cross-sectional shape, wherein open space is provided between said contact portions and the corresponding inner face of said outer casing;
said raised portions of each of said liners are disposed throughout substantially the entire liner;
each of said liners has a generally circular shape;
each of said raised portions generally extends across said liner as a chord of the generally circular shape of said liner;
each of said liners has gap corresponding to said windows;
each of said plastic case portions has four corners;
said plastic case portions are ultrasonically fused to one other at said four corners of each of said plastic case portions;
said nonwoven fabric material is made of one of: polyester texture and rayon texture.

* * * * *

UNITED STATES PATENT AND TRADEMARK OFFICE
CERTIFICATE OF CORRECTION

PATENT NO. : 5,282,106
DATED : January 25, 1994
INVENTOR(S) : Tadashi SAITO, Nobuyuki KISHINE, Takao KANAI AND Mikio OKANO It is certified that error appears in the above-indentified patent and that said Letters Patent is hereby corrected as shown below:

In column 5, line 20, Claim 15, after 'the' delete "first" and insert --second--.

Signed and Sealed this

Twenty-seventh Day of August, 1996

Attest:

BRUCE LEHMAN

Attesting Officer

Commissioner of Patents and Trademarks